United States Patent [19]
Lal et al.

[11] Patent Number: 5,736,020
[45] Date of Patent: *Apr. 7, 1998

[54] TARGET ASSEMBLY FOR USE IN FORMING AN OVERCOAT IN A MAGNETIC RECORDING MEDIUM

[75] Inventors: Brij Bihari Lal; Allen J. Bourez, both of San Jose; Michael A. Russak, Los Gatos, all of Calif.

[73] Assignee: HMT Technology Corporation, Fremont, Calif.

[*] Notice: The term of this patent shall not extend beyond the expiration date of Pat. No. 5,512,150.

[21] Appl. No.: 575,163

[22] Filed: Dec. 19, 1995

Related U.S. Application Data

[63] Continuation-in-part of Ser. No. 427,337, Apr. 24, 1995, Pat. No. 5,520,981.

[51] Int. Cl.$^6$ .................................................. C23C 14/00
[52] U.S. Cl. .................. 204/298.11; 204/298.06; 204/298.08; 204/298.12; 204/298.13; 204/298.14; 204/298.16; 204/298.17; 204/298.18; 204/298.19
[58] Field of Search .................. 204/298.11, 298.13, 204/298.14, 298.16, 298.17, 298.19, 298.06, 298.08, 298.12, 298.18

[56] References Cited

U.S. PATENT DOCUMENTS

| | | | |
|---|---|---|---|
| 4,569,746 | 2/1986 | Hutchinson | 204/298 |
| 4,610,774 | 9/1986 | Sakata et al. | 204/298 |
| 4,671,978 | 6/1987 | Kato et al. | 428/65 |
| 4,882,197 | 11/1989 | Matsudaira et al. | 427/8 |
| 5,045,165 | 9/1991 | Yamashita | 204/192.16 |
| 5,087,482 | 2/1992 | Kawai et al. | 427/129 |
| 5,167,096 | 12/1992 | Eltoukhy et al. | 521/281 SF |
| 5,174,880 | 12/1992 | Bourez et al. | 204/298.17 |
| 5,227,211 | 7/1993 | Eltoukhy et al. | 428/64 |
| 5,324,593 | 6/1994 | Lal et al. | 428/610 |
| 5,366,607 | 11/1994 | Lal et al. | 204/298.19 |
| 5,512,150 | 4/1996 | Bourez et al. | 204/192.2 |
| 5,520,981 | 5/1996 | Yang et al. | 428/65.5 |

FOREIGN PATENT DOCUMENTS 63-50917  3/1988  Japan.

OTHER PUBLICATIONS

Hsiao–chu, T., and Bogy, D.B., "Characterization of Diamondlike Carbon Films and Their Application as Overcoats on Thin–Film Media for Magnetic Recording," *J. Vac. Sci. Technol.*5(6):3287–3312 (1987).

Marchon, B., et al., "Raman and Resistivity Investigations of Carbon Overcoats of Thin–Film Media: Correlations with Tribological Properties," *J. Appl. Phys.*69(8):5748–5750 (1991).

Marchon, B., et al., "Structure and Mechanical Properties of Hydrogenated Carbon Films Prepared by Magnetron Sputtering," *Transactions On Magnetics*27(6):5160–5162 (1991).

*Primary Examiner*—Stevan A. Resan
*Attorney, Agent, or Firm*—Judy M. Mohr; Peter J. Dehlinger

[57] ABSTRACT

A target assembly for use in forming a protective overcoat in a magnetic recording medium is described. The assembly includes a centrally positioned target with inner and outer magnetic means adjacent the target. A sputtering shield is positioned between the target and the medium for controlling the amount and angle of material deposition on the medium. The assembly is effective to deposit an overcoat having a greater thickness in the inner landing zone of the medium than in the outer data zone. A method of using the assembly is also disclosed.

4 Claims, 8 Drawing Sheets

TARGET ASSEMBLY FOR USE IN FORMING AN OVERCOAT IN A MAGNETIC RECORDING MEDIUM

This application is a continuation-in-part of U.S. patent application Ser. No. 08/427,337 for "Recording Medium with Carbon Overcoat Thickness Gradient", filed Apr. 24, 1995 now U.S. Pat. No. 5,520,981.

FIELD OF THE INVENTION

The present invention relates to a target assembly and its method of use in forming a protective overcoat in a magnetic recording disc, where the overcoat in an inner-diameter landing zone of the disc is thicker than in an outer-diameter data zone of the disc.

BACKGROUND OF THE INVENTION

Magnetic recording media, for longitudinal and perpendicular recording, typically require an overcoat for wear and corrosion protection. The overcoat protects the magnetic thin-film layer at its inner-diameter landing zone from damage when the transducer head contacts the disc during a stop-start cycle. In the outer, data zone of the disc, the overcoat functions to protect the disc from environmental factors, such as oxidation or humidity, that can lead to corrosion.

The protection provided by the overcoat is related, in part, to its thickness, where a thicker overcoat offers better wear resistance than a thinner overcoat.

However, a thicker overcoat limits the flying height of a magnetic head on a disc, creating a spacing loss that in turn limits the recording density of the disc.

Therefore, an overcoat that has adequate thickness to offer good wear resistance in the landing zone and to allow the head to fly closely to the medium to minimize spacing loss in the data zone is desirable.

SUMMARY OF THE INVENTION

It is a general object of the invention to provide a target assembly for preparing such an overcoat. It is an additional object of the invention to provide a method of forming such an overcoat.

In one aspect, the invention includes a target assembly for use in depositing a protective overcoat on a magnetic recording medium, where the overcoat extends between an annular, inner landing zone and a data zone. The assembly includes a centrally positioned sputtering target. An inner magnetic means is disposed adjacent an inner annular portion of the target, and the inner magnetic means has a substantially axial magnetic pole orientation. An outer magnetic means is disposed adjacent an outer annular region of the target, and the outer magnetic means has a substantially radial magnetic pole orientation. The inner and outer magnetic means are oriented to produce a magnetic flux sufficient to ignite a sputtering plasma in the target when power is supplied to the target.

The assembly also includes a sputtering shield positioned between the target and the medium, whereby the medium and the shield are oriented to deposit an overcoat on the medium to a thickness of at least 135 Å in the landing zone and a thickness of less than 90 Å in the data zone.

In one embodiment, the inner magnetic means is a permanent magnet and the outer magnetic means is an electromagnet.

The target of the assembly is composed of C, Zr, ZrO$_2$, Si, SiC or SiO$_2$. Preferably, the target is composed of carbon.

In another aspect, the invention includes a method of forming a protective overcoat on a magnetic recording medium, using the target assembly of the invention. The method includes placing the medium in a sputtering chamber having a target assembly with (i) a centrally positioned target, (ii) a shield positioned between the target and the medium, and (iii) inner and outer magnetic means disposed adjacent the target. The magnetic means are oriented to produce a magnetic flux sufficient to ignite a sputtering plasma in the target when power is supplied to the target. A layer is sputtered from the target onto the medium, where the layer has a thickness of at least 135 Å in the inner landing zone of the medium and a thickness of less than 90 Å in the data zone of the medium.

In one embodiment, the overcoat is deposited by sputtering from a carbon target under an atmosphere of pure argon. In another embodiment, the overcoat is deposited by sputtering from a carbon target under an atmosphere containing nitrogen or hydrogen.

In one embodiment of the method of the invention, sputtering is effective to deposit an overcoat having a thickness in the landing zone that is at least two times the thickness of the overcoat in the data zone.

In another embodiment, sputtering is effective to deposit an overcoat having a thickness in the landing zone that is at least three times the thickness of the overcoat in the data zone.

In another aspect, the invention includes an overcoat in a magnetic recording disc of the type having an inner diameter landing zone and an outer diameter data zone. The overcoat includes (i) a first carbon layer extending over the landing zone and the data zone; (ii) a second layer covering the first layer in the landing zone and terminating in a transition region between the landing zone and the data zone, where the transition region forms an annular region having a width of less than about 0.02 inches; and (iii) a third layer covering the second layer in the landing zone and the first layer in the data zone.

In one embodiment, the second layer in the disc has a thickness of between about 80–90 Å. The first and third layers have a thickness of between about 20–30 Å, in another embodiment.

In other embodiments, the second and/or third layers are composed of carbon and also contain nitrogen or hydrogen.

These and other objects and features of the invention will be more fully appreciated when the following detailed description of the invention is read in conjunction with the accompanying drawings.

DETAILED DESCRIPTION OF THE INVENTION

Section I below describes the target assembly of the present invention and, in Section II, a method of preparing an overcoat on a magnetic recording medium using the target assembly is described. The operating characteristics of the target assembly are described in Section III. Section IV describes the properties of an overcoat formed in accordance with the present invention.

I. Target Assembly

Figure 1:
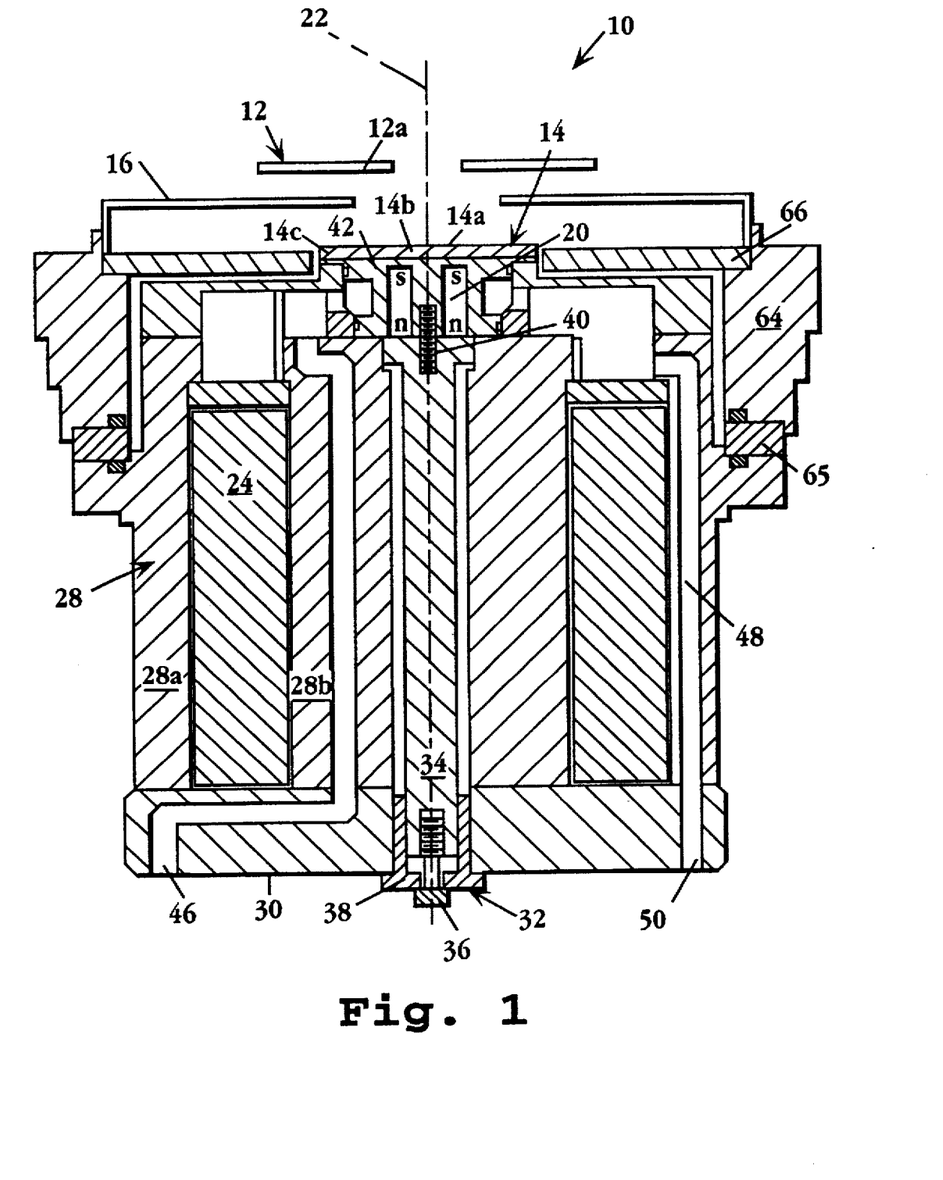
FIG. 1 shows a cross section of a target assembly constructed according to the invention.
Figure 2:
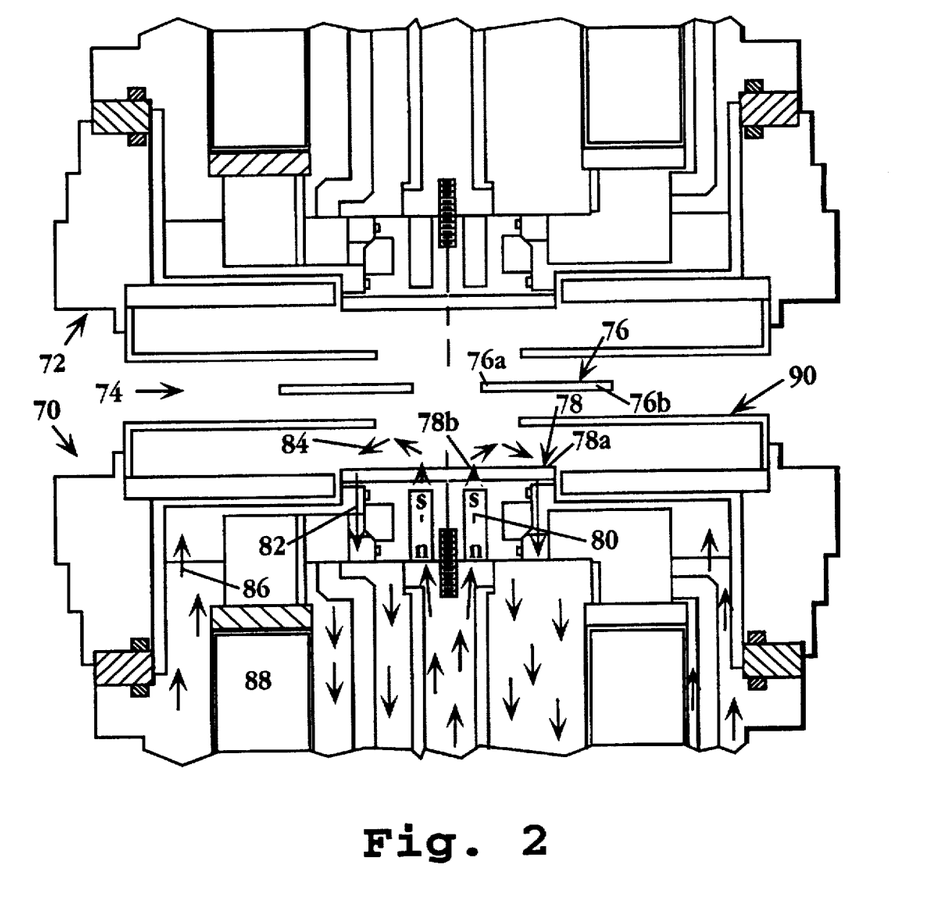
FIG. 2 is a cross sectional view of confronting target assemblies of FIG. 1, defining a sputtering station for deposition of an overcoat onto a medium in accordance with the method of the invention.

FIG. 1 shows in cross sectional view an annular target assembly 10 positioned in a sputtering chamber (not shown) in an in-line, pass-by sputtering apparatus for use in forming a thin-film recording medium. It will be appreciated that a similar target assembly may be positioned "above" assembly 10, as shown in FIG. 2, for sputtering a desired film onto the upper and lower sides of a medium 12 positioned between the confronting target assemblies.

Target assembly 10 includes a centrally positioned sputtering target 14 having a planar sputtering surface 14a. Target 14 is formed of a material suitable for deposition of a protective overcoat on a magnetic recording medium, such as carbon (C), zirconium (Zr), silicon (Si) or alloys of these elements. The target typically has an outer diameter of about 2.25 inches, an inner diameter of about 0.19 inches, and is approximately 0.125 inches in thickness.

A sputtering shield 16 is positioned between target 14 and medium 12 and attached to the target assembly by a suitable means. Shield 16 serves to confine deposition of material from target 14 onto medium 12 to an annular, inner portion 12a of medium 12, as will be discussed in more detail below.

Disposed adjacent an inner annular portion 14b of the target is a permanent magnet 20 having poles, such as a north pole and a south pole designated in FIG. 1, according to convention, as N and S, respectively. Permanent magnet 20 is positioned with its magnetic poles in a substantially axial orientation with respect to the central axis of the target assembly, represented by axis 22. As shown here, the magnet is positioned such that the south pole is nearer inner target 14 than is the north pole. A magnetic field is produced over target surface 14a, as discussed below with respect to FIG. 2, that serves to confine the sputtering plasma to a defined region about the target surface for deposition of material onto medium 12.

It will be appreciated that permanent magnet 20 may also be an electromagnet, or other suitable magnetic means. An inner magnetic means, as referred to herein, refers to such a permanent magnet, or an electromagnet, disposed adjacent the inner annular portion of the target.

An electromagnetic coil assembly 24, also referred to herein as outer magnetic means, is disposed adjacent an outer annular portion 14c of target 14. Electromagnet 24 is oriented with its magnetic poles substantially radial to the central axis of the target assembly. When the coil assembly of electromagnet 24 is energized, a magnetic field is generated, as will be described with respect to FIG. 2, that serves, in part, to ignite a sputtering plasma and to confine the sputtering plasma to a defined region about the target surface for deposition on medium 12.

The outer magnetic means is housed in a pole weldment assembly 28, including an outer cylindrical pole piece 28a and an inner cylindrical pole piece 28b, having a smaller diameter than the outer pole piece. The inner and outer pole pieces are formed of a material, such as 410 stainless steel, that is suitable for conducting magnetic flux, as will be discussed below.

With continuing reference to FIG. 1, a rear pole 30 caps the pole weldment assembly and is held in place by an end assembly 32. End assembly 32 includes a central pole 34 secured at one end by a screw 36 and a pole cap 38.

At the opposite end of the central pole, a screw 40 secures the central pole to a backing plate 42, which abuts target 14. Backing plate 42 is made of a material with a high heat transfer coefficient, such as copper. Target 14 is secured to backing plate 42 by solder, adhesive, or the like.

The target assembly is cooled by water which enters through inlet channel 46, travels in channel 48 around a cavity about the inner and outer targets, and exits via an outlet channel 50.

The target assembly is mounted to a sputtering chamber in a sputtering apparatus through mounting flange 64. A high voltage insulator 65 joins flange 64 to the target assembly. A conventional ground shield 66 extends circumferentially around the target assembly.

The target assembly may also include a means for placing a negative voltage bias of between −50 and −500 volts on the substrate of the medium during sputter deposition. Also included in the assembly, but not shown in the figure, is a DC power source for supplying power to the target.

Turning now to FIG. 2, confronting target assemblies 70, 72, similar to that described in FIG. 1, are shown in cross section. The confronting assemblies define a sputtering station 74 for deposition of material onto a medium, such as magnetic recording medium 76, positioned between the confronting assemblies. It will be appreciated that cathode assemblies 70, 72 are of similar construction, and FIG. 2 will be discussed with respect to assembly 70.

Target assembly 70 includes an annular, sputtering target 78 having a planar sputtering surface 78a. Disposed adjacent an inner annular portion 78b of target 78 is an inner magnetic means, shown here as a permanent magnet 80, having an axial pole orientation, with the south pole designated by an "S" in the figure and the north pole designated by an "N".

Permanent magnet 80 generates a magnetic field along a first path 82, where the magnetic field lines, designated by the arrows in the figure, such as arrow 84, emerge from the permanent magnet at the inner annular portion of the inner target, bend over the surface of the inner target, and re-enter the target again, combining with a second magnetic flux path 86, to be described.

Disposed adjacent an outer annular portion of target 78 is an outer magnetic means, shown in FIG. 2 as an electromagnetic coil assembly 88 housed in a pole weldment assembly as described above in FIG. 1. When power is supplied to the electromagnet a magnetic flux path 86 is produced which is sufficient to ignite target 78 when power is applied to the target. A sputtering plasma is generated above the target for deposition of material onto medium 76.

A sputtering shield 90 is positioned between target 78 and medium 76 and serves to control the angle and extent of deposition of material onto medium 76. As seen in the figure, the shield is positioned such that during deposition of an overcoat onto the medium, more material is deposited in an annular, inner diameter region 76a of the medium than in an annular, outer diameter region 76b. As discussed above, an overcoat having a greater thickness in the inner diameter landing zone provides better wear resistance while the thinner coating in the outer data zone reduces spacing loss.

II. Method of Preparing the Overcoat

In another aspect, the invention includes a method of forming a protective overcoat using the target assembly described above. It will be appreciated that the target assembly can be used for deposition of any layer in the magnetic recording medium, such as an underlayer or a magnetic layer, where a greater thickness in the inner diameter landing zone of the medium is desired. Preferably, the target assembly of the present invention is for use in forming a protective overcoat in a magnetic recording medium.

Figure 3:
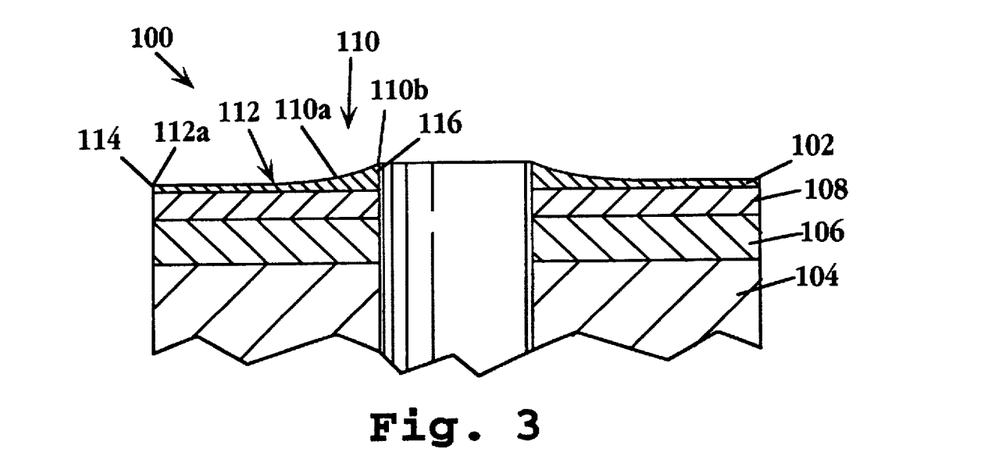
FIG. 3 is a sectional view of a magnetic recording medium having an overcoat formed using the target assembly of the present invention.

FIG. 3 shows a magnetic recording medium 100 in cross section where a protective overcoat 102 is formed in accordance with the invention. As seen, the medium also includes a substrate 104, an underlayer 106 formed directly on the substrate and a magnetic thin-film layer 108 formed on the underlayer.

Medium 100 has an inner-diameter landing zone 110 where, as described above, the head contacts the disc during a start-stop cycle. An outer, data zone 112 extends from outer edge 110a of the landing zone to the outer diameter 114 of substrate 104.

According to an important feature of the invention, overcoat 102 extends across the annular, inner landing zone and the data zone, that is, from an inner edge 110b of the landing zone to an outer edge 112a of the data zone. The overcoat has a greater thickness in the landing zone than in the data zone.

In one embodiment, the thickness of the overcoat decreases gradually and continually across the radius of the disc, on progressing from the inner diameter to the outer diameter. The overcoat thickness in the inner diameter landing zone may be between 135–400 Å, more preferably between 150–300 Å, and the overcoat in the data zone has a thickness of between 30–135 Å, more preferably between 50–90 Å, where the change in thickness is continuous across the two zones. In another embodiment, the thickness of the overcoat in the landing zone is at least two times the thickness of the overcoat in the data zone, and in another embodiment, the thickness of the overcoat in the landing zone is at least three times the thickness of the overcoat in the data zone. Preferably, the thickness in the landing zone is at least 135 Å and the thickness in the data zone is less than 90 Å.

The overcoat, in another embodiment, is a multilayered structure, where at least one layer in the structure extends only across the landing zone and ends in a transition region between the landing zone and the data zone, as will be described below.

Substrate 104 is a standard rigid disc substrate like those used for digital magnetic recording. The substrate may be formed of a metal, such as aluminum, or of a glass or ceramic material. Conventional size substrates have outer diameters of 130 mm (5.25 inches), 95 mm (3.5 inches) or 65 mm (2.5 inches) with corresponding inner diameters of 40 mm (1.57 inches), 25 mm (0.98 inches) and 10 mm (0.79 inches), respectively. The inner and outer edges of the substrate which define these diameters are indicated at 116, 114, respectively, in FIG. 3.

Underlayer 106 is preferably a sputtered chromium underlayer having a thickness between about 100–3,000 Å, more preferably between about 1,000–3,000 Å. Chromium-based alloys, that is an alloy containing at least about 50% chromium, such as CrV, CrGd and CrSi, may also be suitable, as may a tungsten underlayer.

Magnetic film layer 108 is preferably composed of a cobalt-based alloy and is deposited to a thickness of between 100–800 Å. By cobalt-based alloy is meant an alloy containing at least 50% cobalt. Exemplary binary alloys include Co/Cr or Co/Ni, and exemplary ternary, quaternary, and five-element alloys include Co/Cr/Ta, Co/Ni/Pt, Co/Cr/Pt, Co/Ni/Cr, Co/Cr/Pt/B, Co/Cr/Ta/Pt, Co/Ni/Cr/Pt, and Co/Cr/Ni/Pt/B.

Overcoat 102 is composed of a material giving wear-resistant, protective properties to the medium. Preferably, the overcoat is composed of C, Zr, $ZrO_2$, Si, SiC, or $SiO_2$. More preferably, the overcoat is composed of carbon.

In one embodiment of the invention, the overcoat is composed of carbon and contains hydrogen or nitrogen. A hydrogen-doped or nitrogen-doped overcoat is formed by including a hydrogen-containing gas, such as an argon-hydrogen mixture or an argon-methane mixture, or a nitrogen-containing gas, in the sputtering chamber during sputter deposition of the carbon overcoat, as will be described.

Figure 4:
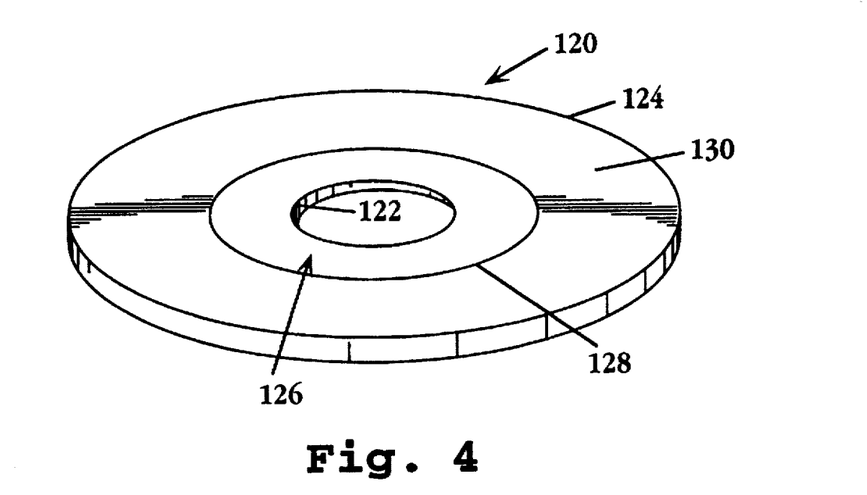
FIG. 4 shows a magnetic recording medium having a landing zone and a data zone.

Turning now to FIG. 4, a magnetic recording disc having a landing zone and a data zone is shown. Seen here is an annular magnetic recording medium 120 of the type having a protective overcoat, as described above with respect to FIG. 3. Annular disc 120 has an inner diameter 122 and an outer diameter 124.

Adjacent the inner diameter is an annular, inner diameter landing zone 126. In use with a magnetic head, the landing zone is the region where the head makes contact with the disc during start\stop cycles or other intermittent occurrences. In FIG. 4, the edge of the landing zone is indicated by line 128, which is the boundary between landing zone 126 and a data zone 130, where magnetic information is stored in the magnetic recording layer of the disc. For a disc having a 1.8 inch outer radius, the boundary is typically at about 0.8 inches, measured from the inner diameter edge, and the head lands at about 0.72 inches.

The thin-film medium of FIG. 3 is formed in a sputtering apparatus having a series of sputtering chambers. Such a sputtering apparatus is commonly known in the art and is commercially available from various sources, such as Circuits Processing Apparatus (Fremont, Calif.), ULVAC (Japan), Leybald Heraeus (Germany), VACTEC (Boulder, Colo.), or Materials Research Corporation (Albany, N.Y.). These systems are double-sided, in-line, high-throughput machines having two interlocking systems, for loading and unloading.

In a sputtering operation, a substrate is initially passed through a heating station which has a plurality of infrared lights which are arrayed for heating both sides of a substrate. Downstream of the heating station is a first sputtering station in which the underlayer is formed on the substrate. The coated substrate then passes to a second sputtering station in which the thin-film magnetic recording layer is formed. Sputter deposition of these layers is performed according to methods known to those skilled in the art.

As referred to herein, a magnetic recording medium refers to a medium having a substrate and at least one magnetic recording layer, but may include other layers, such as an underlayer or an isolation layer deposited between magnetic recording layers.

The magnetic recording medium is then carried to a sputtering chamber, such as chamber 74 described with respect to FIG. 2, for deposition of a protective overcoat. The medium is placed in the sputtering chamber which includes, as described above, a centrally positioned target with inner and outer magnetic means disposed adjacent the target. The magnetic means are oriented to produce a magnetic flux sufficient to ignite a sputtering plasma above the target surface when power is supplied to the target. The magnetic means are also oriented to confine the sputtering plasma to the target surface. A sputtering shield is positioned between the target and the medium for controlling the angle and amount of deposition onto the medium. The sputtering shield is effective to form a layer where the thickness of the coating in the inner diameter landing zone of the medium is thicker than in the outer diameter data zone.

In a preferred embodiment of the invention, a carbon overcoat is formed by sputtering from a graphite target under an atmosphere of pure argon to achieve an overcoat thickness in the landing zone of at least 135 Å and of less than 90 Å in the data zone. In another embodiment, the overcoat in the landing zone is at least about two times the thickness of the overcoat in the data zone. In another embodiment, the overcoat in the landing zone is at least about three times the thickness of the overcoat in the data zone.

In another embodiment of the invention, the overcoat contains hydrogen or nitrogen, introduced into the overcoat by addition of a hydrogen-containing gas, such as methane, or a nitrogen-containing gas to the sputtering atmosphere during deposition of the overcoat. Formation of such an overcoat has been described, for example, in U.S. Pat. No. 5,227,211.

Figure 5A:
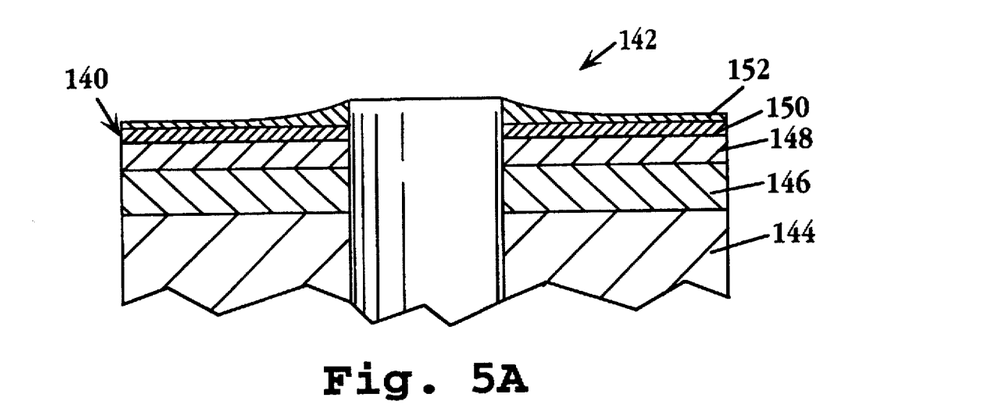
FIGS. 5A–5C are cross sectional views of magnetic recording media having two-layered (FIGS. 5A–5B) and three-layered (FIG. 5C) overcoat structures.
Figure 5B:
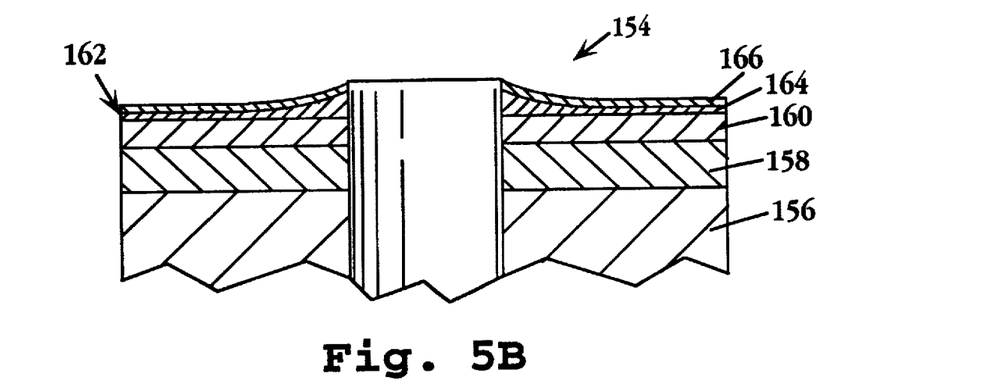

Formation of the overcoat where the thickness is greater in the landing zone than in the data zone may be preceded or followed by deposition of an overcoat layer that is uniform in thickness across the diameter of the disc. FIGS. 5A and 5B show two embodiments of such a structure, where in FIG. 5A a two-layer carbon overcoat structure 140 is deposited on medium 142. Medium 142 also includes a substrate 144, an underlayer 146 and a magnetic recording layer 148. Deposited on the magnetic recording layer is a carbon overcoat having a first layer 150 that is uniform in thickness across the diameter of medium. A second overcoat layer 152 is deposited on the first layer and is formed using the target assembly of the present invention to achieve an overcoat having a greater thickness in the landing zone than in the data zone.

First overcoat layer 150 of structure 140 may be formed of carbon and deposited to a thickness of 20–60 Å, preferably 20–30 Å. Second overcoat layer 152 of structure 140 may be formed of carbon, or of nitrogen-containing or hydrogen-containing carbon, and deposited to a thickness in the landing zone of between 75–150 Å, preferably between 105–125 Å, to give a total overcoat thickness in the landing zone of at least 135 Å. The thickness of the second overcoat layer in the data zone is deposited such that the thickness of the overcoat structure is less than about 135 Å, preferably less than 90 Å.

FIG. 5B shows a magnetic recording medium 154 having a substrate 156, an underlayer 158 and a magnetic recording layer 160 and an overcoat structure 162. Overcoat structure 162 includes a first overcoat layer 164 formed in accordance with the present invention to have a greater thickness in the landing zone of the medium than in the data zone. A second overcoat layer 166 is deposited on the first layer and is continuous in thickness across the diameter of the medium.

Figure 5C:
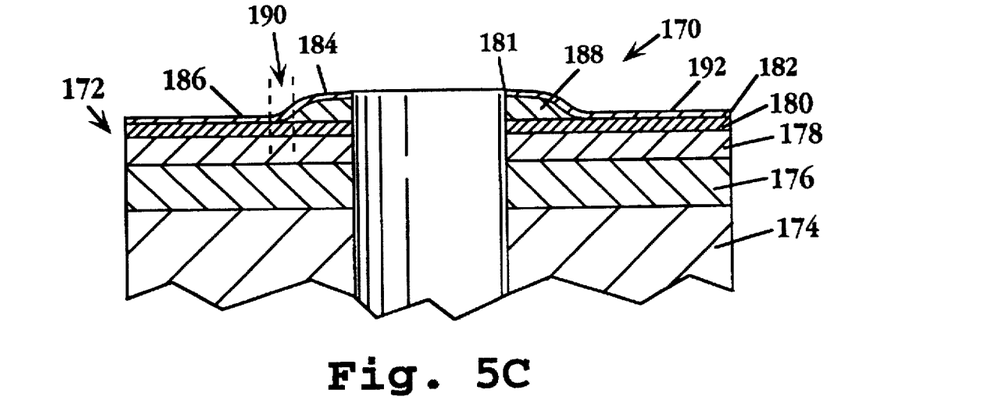

FIG. 5C shows a magnetic recording medium or disc 170 having a three-layer overcoat structure 172. The medium includes a rigid disc substrate 174, an underlayer 176 and a magnetic recording layer 178. Overcoat structure 172 includes a first overcoat layer 180 deposited directly on the magnetic recording layer and extending across the medium from an inner diameter edge 181 to an outer diameter edge 182. That is, the first layer extends over the landing zone 184 and the data zone 186 and, preferably, is uniform in thickness across the zones. The thickness of the first overcoat layer is between 10–50 Å, preferably between 20–30 Å.

Overcoat structure 172 in FIG. 5C also contains a second overcoat layer 188, deposited using the target assembly of the present invention to form a layer which covers the first layer in the landing zone. Second overcoat layer 188 extends from inner diameter edge 181 over landing zone 184 and terminates in a transition region 190 between the landing zone and the data zone. This transition region is indicated in FIG. 5C as the region between the dashed lines. The second overcoat layer in the transition region has a gradient in thickness, where the thickness of the layer decreases from a thickness in the landing zone of between about 50–150 Å, preferably 80–90 Å, to a thickness of less than about 5 Å, preferably less than 1 Å at the end of the transition region. The width of the transition region, that is the distance between the dashed lines, is preferably less than about 0.02 inches (20 mils).

With continuing reference to FIG. 5C, the overcoat structure includes a third overcoat layer 192 which covers the second layer in the landing zone and the first layer in the data zone. The third layer has a thickness of between 10–50 Å, preferably between 20–30 Å and is uniform in thickness across the diameter of the disc.

It will be appreciated that the layers in the overcoat structures described in FIGS. 5A–5C may include hydrogen or nitrogen, by sputtering one or more of the overcoat layers under an atmosphere which also contains hydrogen or nitrogen.

Media having the three-layer overcoat structure described in FIG. 5C were prepared in support of the present invention and tested for wear resistance as will be discussed with respect to FIGS. 8A–8C. The overcoat structure provides excellent wear resistance in the landing zone and in the data zone the thinner overcoat allows the head to fly closer to the medium to reduce spacing loss.

III. Operating Characteristics of the Target Assembly

The operating characteristics of the target assembly described in FIGS. 1 and 2 are summarized in the tables below. The assembly of the present invention is compared to a standard target assembly which, as seen in Table 1, includes a standard sputtering target having an inner diameter of 2.5 inches, and an outer diameter of 5 inches, giving a target area of 14.7 in$^2$. Such a standard target is positioned adjacent the outer magnetic means of an assembly similar to that shown in FIG. 1. By contrast, the target in the assembly of the present invention is centrally positioned, adjacent the inner magnetic means, and has an outer diameter of approximately 2.25 inches and a target area of about 3.97 in².

TABLE 1

|  | Standard 5' Target | Target Assembly of Present Invention |
|---|---|---|
| Target Size | 5" OD 2.5" ID | 2.25" OD |
| Target Area | 14.7 sq. in. | 3.97 sq. in. |
| Sputtering Shield | None | YES |
| Magnetic Field Source | Outer Electro Magnet | Inner Permanent Magnet Outer Electro Magnet |
| Source to Substrate Distance | 2" | 1.625" |
| Deposition | Full-Surface | ID Zone |
| Lowest Sputter Pressure | 3 mTorr | 1 mTorr |
| Target Power Density | 169.8 W/sq. in. (at 2.5 KW) | 164 W/sq. in (at 0.6 KW) |
| Sputter Rate | 5.8 Å/kw sec | 11–19 Å/kw sec |

In operation, the target in the assembly of the present invention, which includes a sputtering shield having an aperture of, for example, 1.4 inches, for deposition of material primarily in the inner diameter region of a substrate, ignites at a sputtering pressure of about 1 mTorr. The target power density at 0.6 KW was 164 W/in² and a sputtering rate of 11–19 Å/kw sec was obtained using a graphite target under atmospheres of argon and nitrogen-containing argon. The standard target required a higher sputtering pressure for ignition and a lower sputtering rate was achieved.

In experiments performed in support of the invention, carbon overcoats were deposited on media using the target assembly of the present invention, and compared to overcoats deposited using a standard target assembly. Tables 2 and 3 show the deposition parameters of these experiments, where in Table 2, overcoats were deposited by sputtering from a graphite target under an argon atmosphere. Table 3 shows the deposition parameters used for sputtering a nitrogen-containing overcoat by sputtering from a graphite target under an atmosphere of nitrogen:argon.

TABLE 2

|  | Standard 5' Target | Target Assembly of Present Invention |
|---|---|---|
| Sputtering Pressure (mTorr) | 4.5 | 4.5 |
| Argon Gas Flow (sccm) | 20 | 20 |
| Sputtering Power (kw) | 2.5 | 0.5 |
| Sputtering Time (sec) | 3 | 60 |
| Avg. Film Thickness (Å) | 40 | 330 |
| Sputtering Rate (Å/kw sec) | 5 | 11 |

TABLE 3

|  | Standard 5' Target | Target Assembly of Present Invention |
|---|---|---|
| Sputtering Pressure (mTorr) | 5.8 | 5.8 |
| Nitrogen/Argon Gas Flow (sccm) | 30 | 30 |
| Sputtering Power (kw) | 2.5 | 0.5 |

TABLE 3-continued

|  | Standard 5' Target | Target Assembly of Present Invention |
|---|---|---|
| Sputtering Time (sec) | 7 | 60 |
| Avg. Film Thickness (Å) | 125 | 580 |
| Sputtering Rate (Å/kw sec) | 8 | 19 |

Table 2 show that a carbon overcoat deposited using the target assembly of the present invention under an atmosphere of pure argon achieved a sputtering rate of 11 Å/kw sec. As seen in Table 3, a sputtering rate of 19 Å/kw sec was achieved using the target assembly of the present invention under a nitrogen-containing sputtering atmosphere. These sputtering rates are more than a two-fold improvement over the sputtering rate achieved using the standard target assembly under similar deposition conditions.

IV. Overcoat Properties

A. Wear-Resistance

Contact-stop-start experiments were performed on magnetic recording media fabricated with carbon overcoats varying in thickness. FIGS. 6A–6F are plots of stiction coefficient against number of cycles in contact-start-stop (CSS) experiments for media prepared with carbon overcoat thicknesses of 56 Å (FIG. 6A), 91 Å (FIG. 6B), 135 Å (FIG. 6C), 183 Å (FIG. 6D), 216 Å (FIG. 6E) and 330 Å (FIG. 6F).

In the CSS tests shown in FIGS. 6A–6F, media were formed by depositing an underlayer, a magnetic recording layer and a carbon overcoat to a desired thickness on a 95 mm Al/NiP substrate. The tests were performed at ambient temperature and relative humidity. A thin film head (Applied Magnetics Corporation, LCI, 70%) with 6.5 gram load was used for testing on 95 mm disks at radius of 0.78 inches.

Figure 6A:
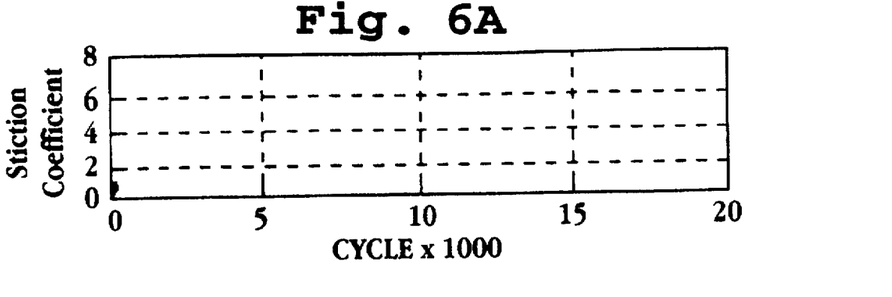
FIGS. 6A–6F are plots of stiction coefficient against number of cycles in contact-start-stop (CSS) experiments for media prepared with carbon overcoat thicknesses of 56 Å (FIG. 6A), 91 Å (FIG. 6B), 135 Å (FIG. 6C), 183 Å (FIG. 6D), 216 Å (FIG. 6E) and 330 Å (FIG. 6F)
Figure 6B:
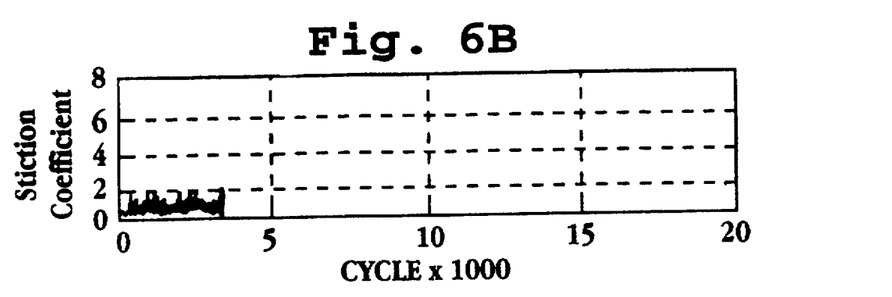
Figure 6C:
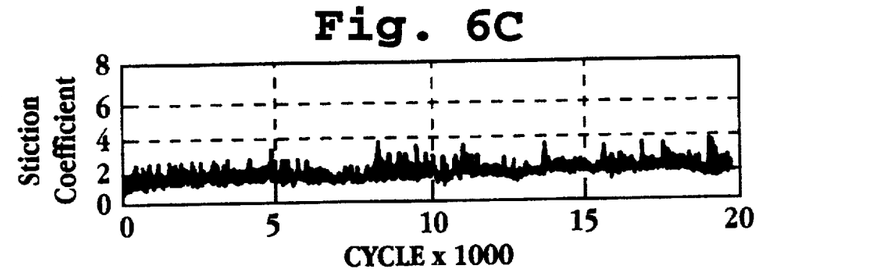
Figure 6D:
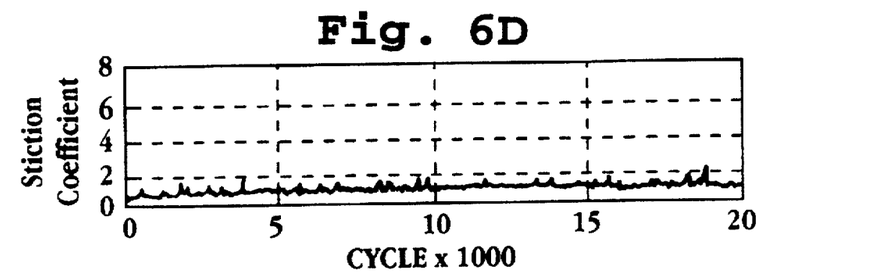
Figure 6E:
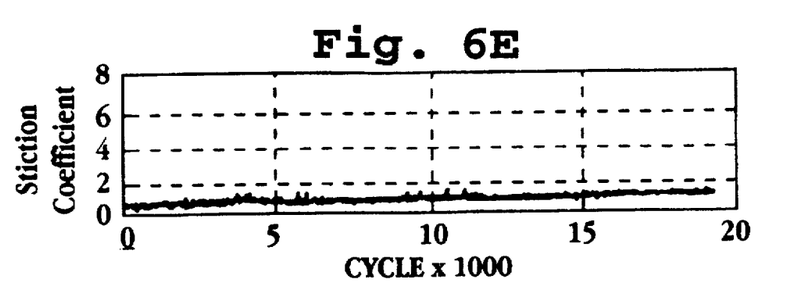
Figure 6F:
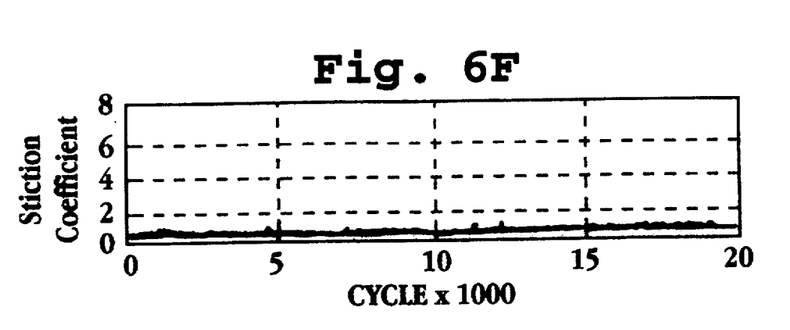

FIG. 6A shows that a carbon overcoat having a thickness of 56 Å is quickly worn away, offering little protection and wear resistance. An overcoat of 91 Å offers a lifetime of about 3,000 CSS cycles (FIG. 6B). A carbon overcoat of 135 Å or greater, (FIGS. 6C–6F) offer excellent wear resistance, having a lifetime of greater than 20,000 cycles. As seen in FIG. 6D, a carbon overcoat having a thickness of 183 Å has low stiction and excellent modulation. Thicker carbon overcoats also give better reproducibility in stiction.

B. Overcoat Thickness Profile

In other experiments performed in support of the invention, magnetic recording media were prepared by depositing on a nickel-plated aluminum substrate a chromium underlayer and a CoCrTa magnetic recording layer. A nitrogen-containing carbon overcoat was deposited by sputtering from the target assembly of the present invention (as described in FIG. 2) in accordance with the method of the invention. Sputtering was from a centrally-positioned graphite target and under a nitrogen-argon atmosphere. Sputtering shields having apertures of 1.2 inches, 1.4 inches and 1.6 inches were positioned between the medium and the target to controllably vary the deposition of material onto the medium. Deposition was conducted at a sputtering pressure of 5 mTorr for 60 seconds at a power density of 500 Watts.

Figure 7A:
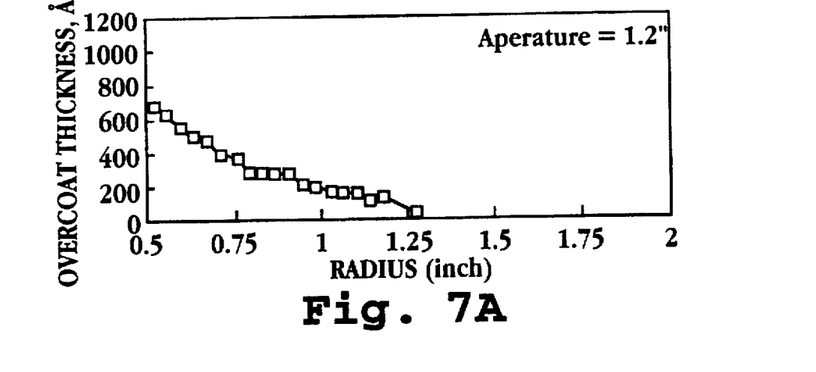
FIGS. 7A–7C show the overcoat thickness profiles, plotted as thickness (Å) against substrate radial position in inches, of magnetic recording media formed using the target assembly of the present invention with shields having apertures of 1.2 inches (FIG. 7A), 1.4 inches (FIG. 7B) and 1.6 inches (FIG. 7C)
Figure 7B:
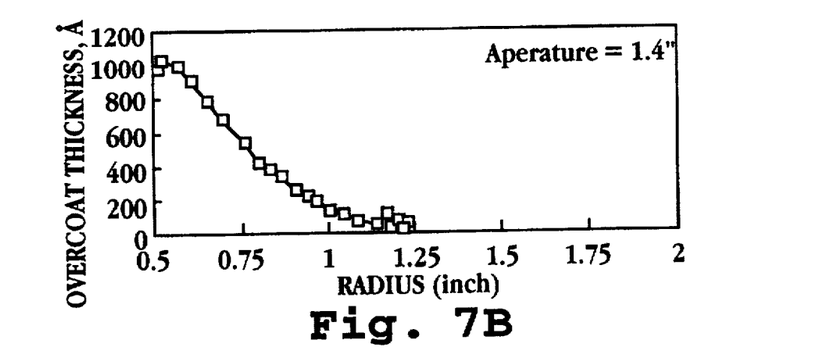
Figure 7C:
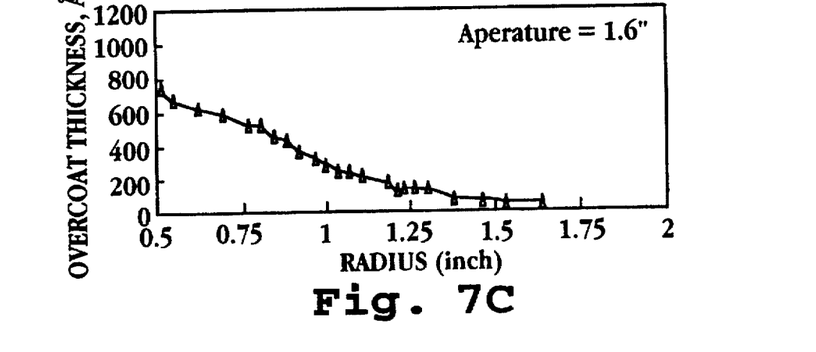

FIGS. 7A–7C show overcoat thickness profiles of the media, plotted as overcoat thickness (Å) against substrate radial position in inches. As seen in FIG. 7A, a sputtering shield with an aperture of 1.2 inches resulted in a medium having a carbon overcoat with a thickness of about 650 Å at the disc's inner radial position of 0.5 inches. The thickness of the overcoat decreases uniformly across the boundary between the inner landing zone and the outer data zone, where the overcoat at radial positions greater than 0.8 inches decreases from 300 Å to less than 100 Å at the outer radial edge of the disc.

FIG. 7B shows the nitrogen-containing carbon overcoat thickness profile obtained by sputtering with a shield having an aperture of 1.4 inches. The inner diameter landing zone on the overcoat, taken as the radial position from about 0.5 to 0.8 inches, decreases in thickness from about 1000 Å to 400 Å. In the outer diameter data zone of the disc, taken from 0.8 inches to about 1.25 inches, the overcoat thickness decreased from about 400 Å to less than 90 Å.

FIG. 7C is a plot similar to FIGS. 7A and 7C showing a thickness profile for a nitrogen-containing carbon overcoat sputtered using a shield having a 1.6 inch aperture. Here, the inner landing zone of the overcoat has a thickness between 500–700 Å and the outer data zone has a thickness which decreases from 500 Å to less than 100 Å at a radial position of 1.35 inches.

C. Wear Resistance of Three-Layer Overcoat

Magnetic recording media having a three-layered overcoat structure like that described in FIG. 5C were prepared and tested for wear resistance. The first layer in the overcoat structure, adjacent the magnetic recording layer, was a standard carbon layer having a uniform thickness across the diameter of the medium. The second layer, deposited directly on the first overcoat layer and covering the first layer in the landing zone, was sputtered under a nitrogen-containing atmosphere using the target assembly of the present invention. The second overcoat layer extends across the landing zone and terminates in a transition region between the landing zone and the data zone, as described in FIG. 5C. The third overcoat layer in the structure was deposited in a standard target assembly under a nitrogen-containing atmosphere to give a nitrogen-containing layer that covers the second layer in the landing zone and the first layer in the data zone. The thicknesses reported for the media formed are for the entire overcoat structure (all three layers) at an inner diameter position in the landing zone and were determined based on the sputtering rates for deposition of each layer. Contact-start-stop tests were performed as described above, at ambient temperature and relative humidity.

Figure 8A:
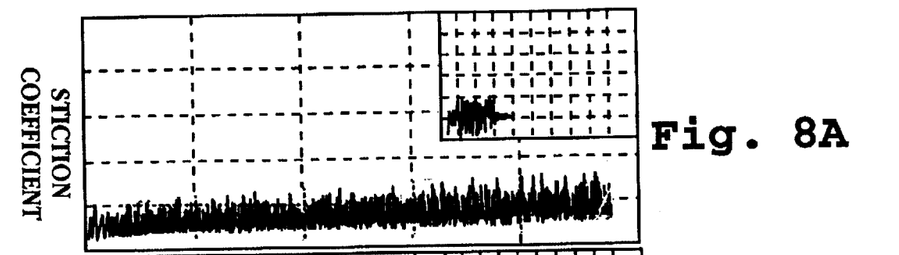
FIGS. 8A–8C are plots of stiction coefficient against number of cycles in contact-start-stop (CSS) experiments for media prepared with carbon overcoat structures having thicknesses of 170 Å (FIG. 8A), 197 Å (FIG. 8B) and 214 Å (FIG. 8C).
Figure 8B:
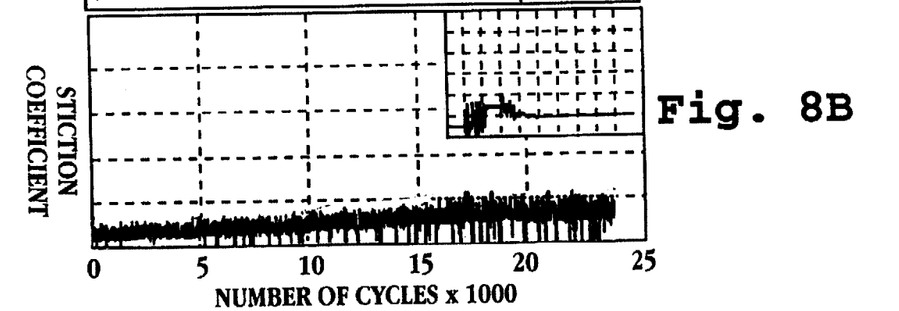
Figure 8C:
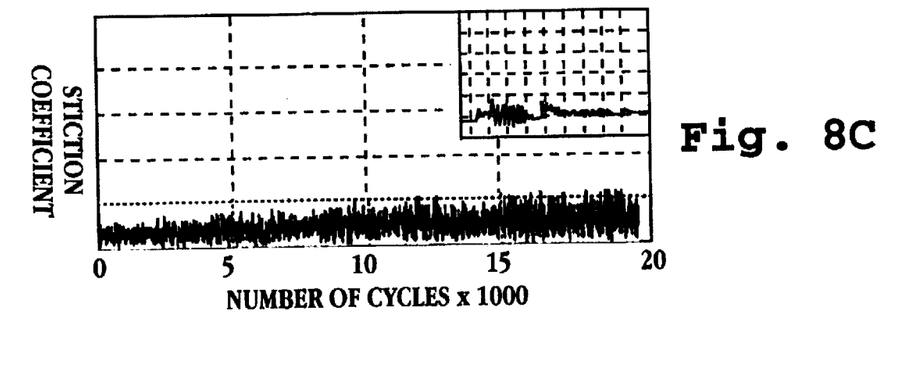

FIGS. 8A–8C are plots of stiction coefficient against number of cycles in contact-start-stop (CSS) experiments on magnetic recording media having carbon overcoats with thicknesses in the landing zone at radial position of 0.8 inches of 170 Å (FIG. 8A), 197 Å (FIG. 8B), 214 Å (FIG. 8C).

FIG. 8A shows that an overcoat thickness of 170 Å in the landing zone of the medium gives good wear resistance for about 20,000 contact-start-stop cycles. The coefficient of friction was 1.05.

FIGS. 8B and 8C show that overcoat thicknesses of 197 Å and 214 Å, respectively, give excellent wear resistance for greater than 20,000 contact-start-stop cycles, with final coefficients of friction of 1.23 and 1.65, respectively.

D. Parametrics of Media with a Three-Layer Overcoat

Parametric testing was performed on the media having the three-layer overcoat structure described above in section IVC. Table 4 shows the effect of overcoat film thickness on the parametrics of the media.

TABLE 4

| Overcoat Thickness (Å) | Coercivity (Oe) | \multicolumn{7}{c}{Parametrics at Inner Diameter R = 0.814"} |
|---|---|---|---|---|---|---|---|
| | | HF Amp (μV) | Res. (%) | OW (−dB) | PW 50 (ns) | BS (ns) | DC-SNR (dB) |
| 170 | 2008 | 193 | 82.8 | 30 | 25.4 | 1.89 | 26.2 |
| 197 | 2055 | 179 | 80.0 | 28.6 | 26.0 | 2.07 | 25.4 |
| 214 | 2023 | 175 | 79.5 | 28.4 | 26.2 | 2.12 | 25.4 |

Table 4 shows that, in general, media parametrics improve as the thickness of the overcoat structure decreases. This is due, at least in part, to the reduction in spacing loss achieved by the transducer head flying closer to the medium when the overcoat is thinner. The medium having an overcoat structure with a total thickness of 170 Å has a high-frequency signal amplitude (HF Amp.) of 193 μV, a resolution (Res.) of 82.8%, an overwrite of 30 -dB, a pulse-width of 25.4 nsec, a bit shift (BS) of 1.89 ns, and a DC signal-to-noise ratio of 26.2 dB. The medium with an overcoat of 170 Å has an improvement in HF signal amplitude, overwrite, pulse width and signal-to-noise ratio compared to the thicker overcoats of 197 Å and 214 Å.

From the foregoing it can be appreciated how various objects and features of the invention are met. The target assembly of the present invention is effective to form on a magnetic recording medium an overcoat that is greater in thickness in the landing zone than in the data zone. Such an overcoat achieves excellent wear resistance and enhanced magnetic recording properties.

Although the invention has been described with respect to particular embodiments, it will be apparent to those skilled in the art that various changes and modifications can be made without departing from the invention.

It is claimed:

1. A target assembly for use in depositing a protective overcoat on a magnetic recording medium, where said overcoat extends across an annular, inner landing zone and a data zone, said assembly comprising:
   a centrally positioned sputtering target,
   inner magnetic means disposed adjacent an inner annular portion of said target, and having a substantially axial magnetic pole orientation,
   outer magnetic means disposed adjacent an outer annular region of said target, and having a substantially radial magnetic pole orientation,
   said inner and outer magnetic means being oriented to produce a magnetic flux sufficient to ignite a sputtering plasma in said target when power is supplied to said target, and
   a shield positioned between said target and a station in the assembly adapted to support such a magnetic recording medium, said shield being positioned between said target and said medium when the medium is held in such a station,
   whereby said medium and said shield are oriented to deposit an overcoat on said medium to a thickness of at least 135 Å in the landing zone and a thickness of less than 90 Å in the data zone.

2. The assembly of claim 1, wherein said inner magnetic means is a permanent magnet and said outer magnetic means is an electromagnet.

3. The assembly of claim 1, wherein said target is composed of a material selected from the group consisting of C, Zr, $ZrO_2$, Si, SiC and $SiO_2$.

4. The assembly of claim 3, wherein said target is composed of carbon.

* * * * *

UNITED STATES PATENT AND TRADEMARK OFFICE
CERTIFICATE OF CORRECTION

PATENT NO. : 5,736,020
DATED : April 7, 1998
INVENTOR(S) : Briji Bihari Lal, et. al.

It is certified that error appears in the above-indentified patent and that said Letters Patent is hereby corrected as shown below:

Title page, item [75], inventors should read --
Brij Bihari Lal; Allen J. Bourez; Ming M. Yang,
all of San Jose;
James L. Chao, Milpitas;
Michael A. Russak, Los Gatos,
All of Calif.--.

Signed and Sealed this

Twenty-eighth Day of July, 1998

Attest:

BRUCE LEHMAN

Attesting Officer      Commissioner of Patents and Trademarks